(12) United States Patent
Kasper et al.

(10) Patent No.: US 6,999,857 B1
(45) Date of Patent: Feb. 14, 2006

(54) DATA COMMUNICATION AND POWER TRANSMISSION SYSTEM FOR SENSING DEVICES

(75) Inventors: Rolf G. Kasper, Old Lyme, CT (US); Anthony B. Bruno, East Lyme, CT (US); James D. Hagerty, Tiverton, RI (US); Promode R. Bandyopadhyay, Barrington, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 97 days.

(21) Appl. No.: 10/652,085

(22) Filed: Aug. 25, 2003

(51) Int. Cl.
  *H04B 7/00* (2006.01)
(52) U.S. Cl. .............................. 701/1; 701/35; 701/21; 340/850; 340/852
(58) Field of Classification Search .................... 701/1, 701/21, 35; 340/850, 852
See application file for complete search history.

(56) References Cited

U.S. PATENT DOCUMENTS

| | | | | |
|---|---|---|---|---|
| 5,437,058 A | * | 7/1995 | Grosz et al. | 455/41.1 |
| 5,970,393 A | * | 10/1999 | Khorrami et al. | 455/129 |
| 5,982,297 A | * | 11/1999 | Welle | 340/870.16 |
| 6,134,485 A | * | 10/2000 | Tanielian et al. | 701/14 |
| 6,593,900 B1 | * | 7/2003 | Craven et al. | 343/895 |
| 6,625,084 B1 | * | 9/2003 | Payton | 367/134 |
| 6,662,642 B2 | * | 12/2003 | Breed et al. | 73/146 |
| 2004/0066313 A1 | * | 4/2004 | Ong et al. | 340/870.11 |

* cited by examiner

*Primary Examiner*—Michael J. Zanelli
*Assistant Examiner*—Eric M. Gibson
(74) *Attorney, Agent, or Firm*—Jean-Paul A. Nasser; James M. Kasischke; Michael P. Stanley

(57) ABSTRACT

A wireless power transmission and communication network that provides efficient interrogation and powering of sensors for use on undersea vehicles. The present invention employs a wave-guide that allows the propagation of electromagnetic waves through a dielectric material that covers the exterior of an undersea vehicle's hull. Embedded within the dielectric material is an N dimensional array of Micro Electronic Mechanical Systems sensing devices coupled with radio frequency (RF) decoders and transceivers, and strips of conductive metal tape. Electromagnetic waves such as microwaves propagate through the dielectric material both powering the sensor network and addressing and interrogating individual sensing devices. The sensing devices take readings and then format and transmit the data results back across the wave-guide where they are received and processed by a digital processor within the hull of the undersea vehicle.

16 Claims, 5 Drawing Sheets

DATA COMMUNICATION AND POWER TRANSMISSION SYSTEM FOR SENSING DEVICES

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

This patent application is co-pending with a related patent application entitled SYSTEM AND METHOD FOR CONNECTING WITH A NETWORK OF SENSORS Ser. No. 10/652,084, by Anthony B. Bruno and James D. Hagerty both of whom are common inventors as to this application.

BACKGROUND OF THE INVENTION (1) Field of the Invention

The present invention relates in general to data communication and power transmission systems, and more specifically to a wireless data communication and power transmission system for use with a network of sensing devices.

(2) Description of the Prior Art

Sensor technology in the broad sense involves measurements of a variety of physical phenomena. Sensing devices exist which can measure thermal energy, radiant energy, acoustic energy, air pressure, water pressure, velocity, acceleration, chemical concentrations and so on. Often these devices are able to detect phenomena far beyond human sensing capabilities.

Sensing devices are indispensable for allowing human travel through certain environments. In the harsh undersea environment, for example, sensing devices provide "sight" and "hearing" to undersea vehicles. Sensor measurements are used to aid underwater vehicles in navigation and in detection of other objects in the surrounding sea. Underwater vehicles, particularly large submarines, use a variety of sensing devices electrically wired and attached to the exterior of their hulls. There is, however, an ever-increasing demand for greater sensing capabilities for underwater vehicles. Underwater vehicles need a heightened awareness of their surrounding environment in order to perform the ever-demanding tasks expected of them. To meet this need underwater vehicles must employ more sophisticated and more sensitive sensing devices and must employ them in larger numbers on a much greater scale than now used. Current methods, however, do not address the various constraints involved in implementing a very large sensor network for underwater vehicles. Underwater vehicles are constrained by the size of the sensing devices and the available space on the hull exterior. A significant increase in the number of sensing devices would increase the overall weight of an underwater vehicle. It would affect the construction methods used in building the underwater vehicle, and alter the structural design of the underwater vehicle. More sensors would also require increased power expenditures, an increase of bundled wiring and a complex addressing and communication system to monitor the multitude of sensing devices.

Use of sensing devices that are drastically reduced in size alleviates several of the above-mentioned constraints such as available space, weight, shape and power consumption. There currently exist Micro Electronic Mechanical Systems (MEMS) sensors that are significantly smaller than the sensors commonly used on the exterior of underwater vehicles. MEMS devices are an integration of mechanical elements and electronics on a common substrate such as silicon. The electronics are fabricated using integrated circuit (IC) process sequences. The micro-mechanical components are fabricated using compatible "micro-machining" processes that selectively etch away parts of the substrate (e.g., silicon wafer) or add new structural layers to form the mechanical and electromechanical devices. MEMS sensing devices have low power consumption, are smaller, more functional, lighter, more reliable and are produced at a fraction of the cost of conventional macro-scale devices.

Use of MEMS sensing devices allows for sensor networks on the order of $10^6 \times 10^6$ arrays of sensing devices arranged over the exterior of a underwater vehicle's hull. Powering such a large sensor network and communicating with the network using the conventional method of conductive wire bundles is overly complicated from both a design and a maintenance perspective, not to mention cost prohibitive.

U.S. Pat. No. 6,208,247 to Agre et al, for "Wireless Integrated Sensor Network Using Multiple Relayed Communications" (issued Mar. 27, 2001) teaches a sensor network that employs miniature sensors in wireless communication. The invention is used in a large network of wireless nodes dispersed over a distance of 100 yards. The nodes are self contained battery powered miniature electronic sensing stations adaptable for two way wireless communication. The aforementioned patent, while offering valuable information, does not by itself address the need for a wireless power transmission and communication network of low power sensors. It does not incorporate wireless power transmission, but rather relies on batteries to provide power to the sensing stations. Furthermore it is not adaptable to an underwater environment.

There is currently no apparatus for efficient, cost effective powering and communicating with a large array of MEMS sensors. What is needed is a wireless power transmission and communication network that can interrogate and power sensors for use on an underwater vehicle.

SUMMARY OF THE INVENTION

It is a general purpose and object of the present invention to provide apparatus that efficiently powers and communicates with a large array of sensing devices arranged over the exterior of an underwater vehicle's hull.

It is a further object to power and communicate with the sensing devices by employing wireless technology.

It is still a further object to integrate the sensing devices into the very structure of the underwater vehicle.

Another object is to employ an electromagnetic waveguide as a transmitting medium for power and communication transmissions.

Still another object is to establish a network of wireless electromagnetic wave transceivers to channel a digital data signal between the sensing devices on the exterior of the underwater vehicle and a central data processor within the underwater vehicle.

These objects are accomplished with the present invention by covering the exterior of an underwater vehicle's hull with an elastomeric dielectric material that has embedded within it an N dimensional array of sensing devices and strips of conductive metal tape. The combination of the metal hull exterior, the conductive metal tape embedded within the dielectric outer covering, and the liquid medium of water in contact with the dielectric material forms a wave-guide that allows the propagation of electromagnetic waves through the dielectric outer covering of the underwater vehicle's hull surface. In a preferred embodiment, the electromagnetic waves propagating through the dielectric are microwaves that serve to both power the sensor network and address and interrogate each of the uniquely addressable sensing devices.

Each sensing device is an integrated package of components performing separate multiple functions. For instance, each sensing device employs radio frequency (RF) transceiving and decoding electronics similar to those used in digital cellular telephones. These components receive and decode the address and interrogation signal generated by a central microwave transceiver. Each sensing device also employs power detection and rectification electronics to detect and rectify microwave energy propagating through the wave-guide. When the sensing device extracts power and receives an interrogation signal it takes a measurement and transmits the measurement results back to the microwave transceiver. The N dimensional array of sensing devices embedded in the surface of the exterior hull of a underwater vehicle are communicating over what is essentially a single cell digital cellular communications network with the microwave transceiver serving as the base station.

The data that is transmitted back to the microwave transceiver includes the address of the unique sensor to identify the source. The microwave transceiver ultimately converts the data from an electrical signal to an optical format suitable for transmission over a fiber optic cable. The data is then transmitted as an optical signal for processing to a digital processor within the hull of the underwater vehicle.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
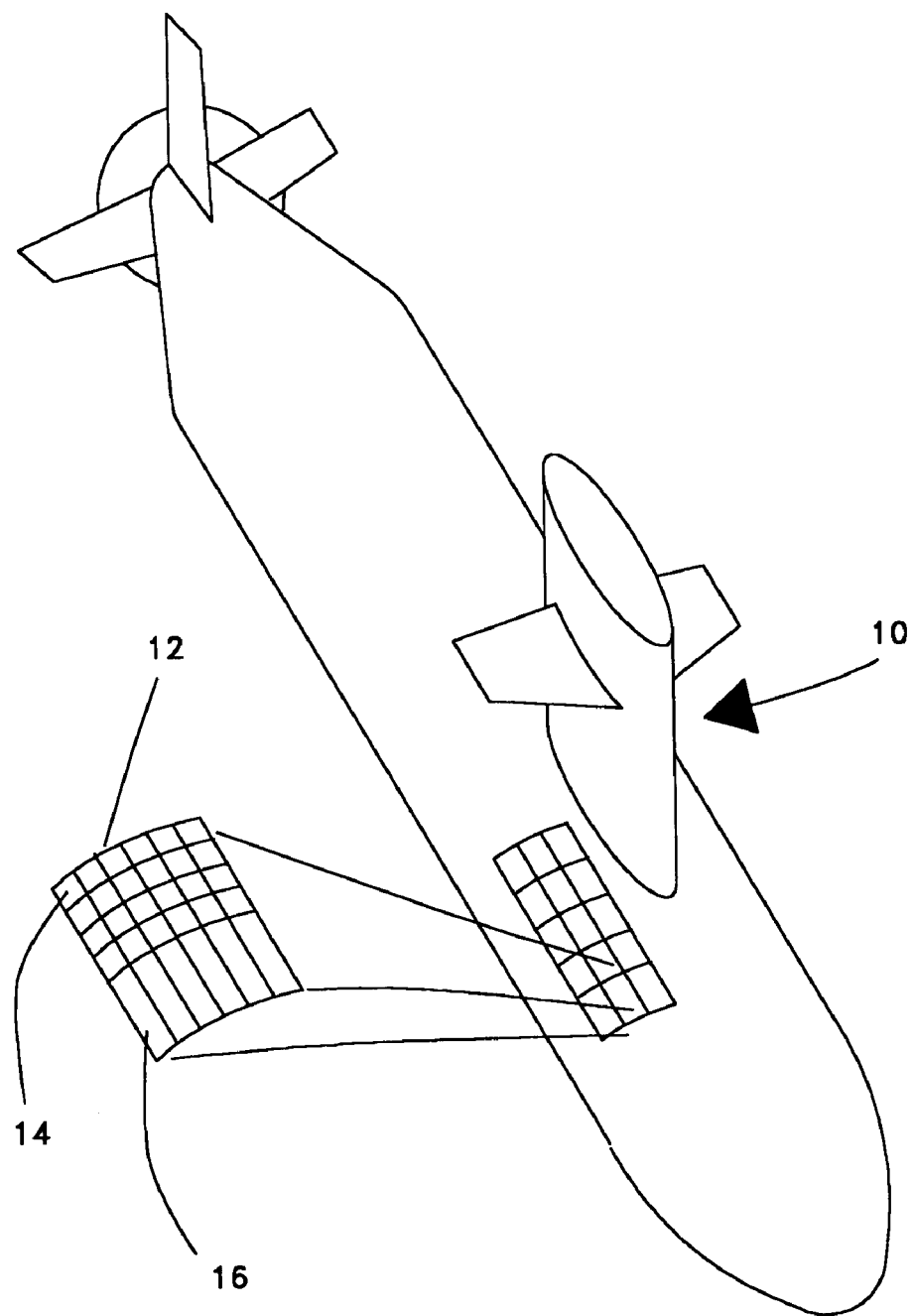
FIG. 1 shows a schematic diagram depicting an undersea vehicle with an enlarged breakout section of the dielectric material covering the exterior hull.

Referring now to FIG. 1, there is shown an underwater vehicle 10 submerged in water with an enlarged view of an isolated section 12 of the exterior of its hull. The isolated section 12 is a transparent view of an elastomeric dielectric material covering the exterior of the hull with sensing devices 14 and strips of conductive metal tape 16 embedded in the dielectric material.

Figure 2:
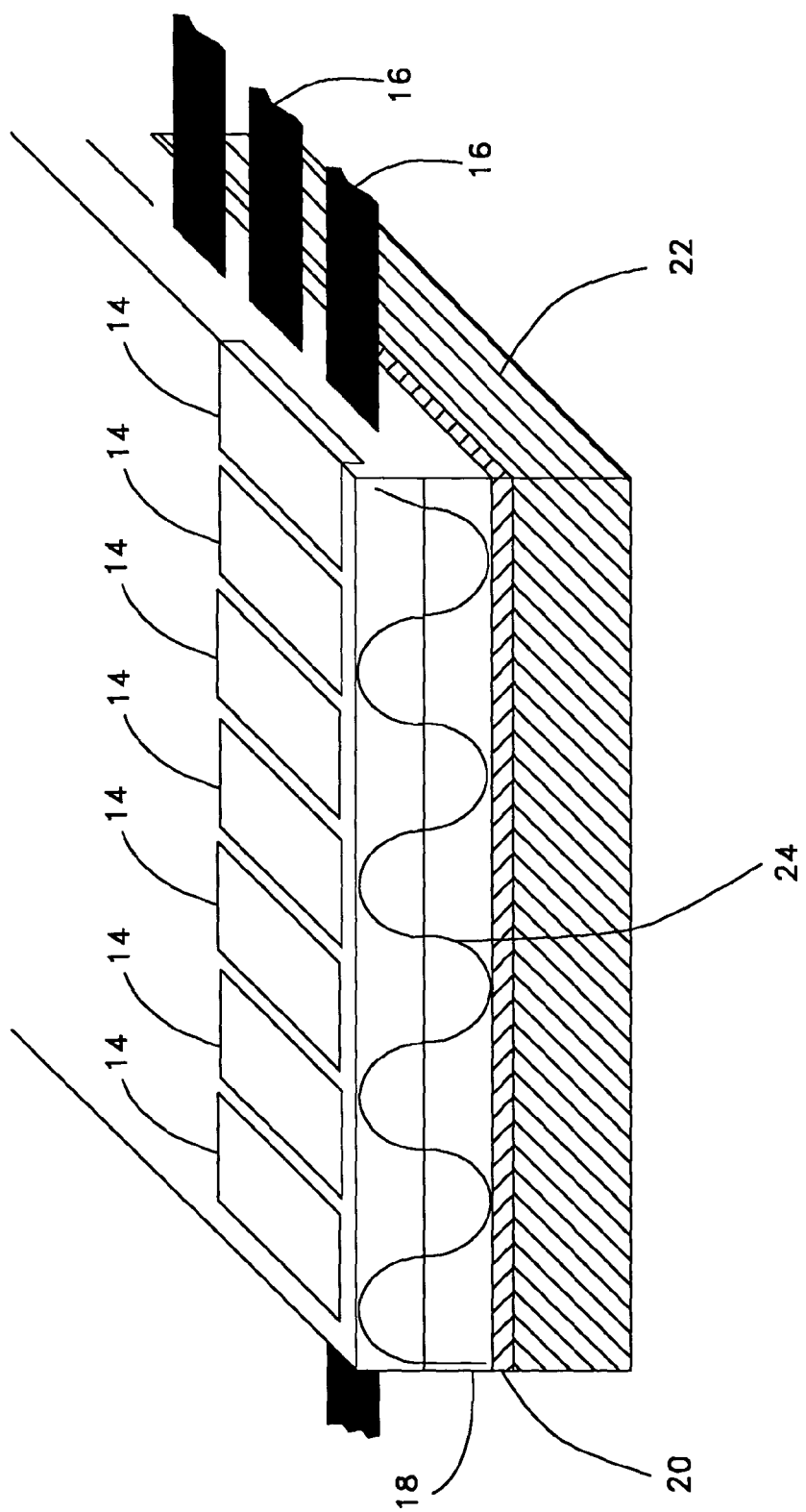
FIG. 2 shows a cross sectional view of the various components of the wave-guide and sensor array embedded in the dielectric cover as disposed over the exterior hull of the vehicle in FIG. 1.

Referring now to FIG. 2, there is shown a cross sectional view of the enlarged portion of the underwater vehicle hull of FIG. 1. The sensing devices 14 and the strips of conductive metal tape 16 are disposed throughout the top layer 18, which is the dielectric material. The second layer 20 is an epoxy used to secure the dielectric material to the third layer, the metal hull 22. The combination of the outer surface of the hull 22, conductive metal tape 16 embedded within the dielectric material 18, and the liquid medium of water in contact with the dielectric material forms a wave-guide that allows the propagation of electromagnetic waves through the dielectric material 18. An electromagnetic wave propagating through the dielectric is illustrated by the sinusoidal wave 24.

Figure 3:
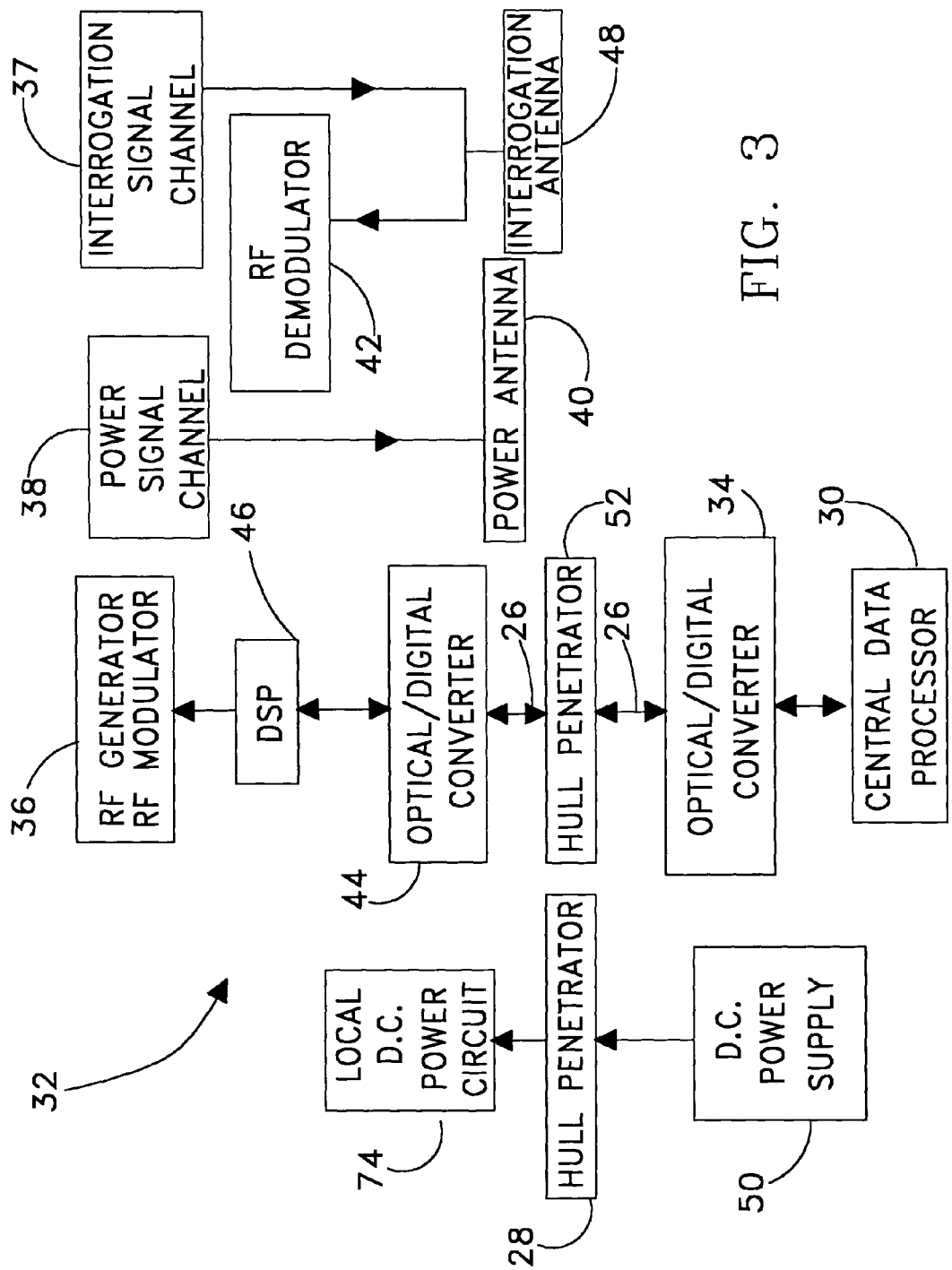
FIG. 3 shows a diagram of the central data processor in communication with the microwave transmitter/demodulator across a fiber optic interface cable passing through the exterior hull of the vehicle of FIG. 1.

Referring now to FIG. 3 there is shown a block diagram of the various components of the invention. A fiber optic cable 26 passes through the hull 22 via a hull penetrator 28. The fiber optic cable 26 serves as the interface between a central data processor 30 inside hull 22 of the underwater vehicle 10 and a microwave transmitter/demodulator 32 mounted on the exterior surface of hull 22. One of the benefits of using a fiber optic interface is the high bandwidth available using that type of data transmission medium. Another benefit is the very small diameter of cable 26, allowing for the smallest possible aperture in the hull penetrator 28. In an alternative embodiment electrical signals can be used to transmit the data.

Referring now to FIGS. 1 through 3, the central data processor 30 is a digital data processor located inside the underwater vehicle 10. The central data processor 30 controls the scheduling of interrogation of the network of sensing devices 14 by notifying the microwave transmitter/demodulator 32 to broadcast an interrogation signal to specific sensing devices 14. The central data processor 30 also receives and processes sensor data. Optical to digital converter 34 converts sensor data from fiber optic format to digital electrical format before it is received by the central data processor 30 and converts central data processor instructions to the microwave transmitter/demodulator 32 from digital electrical format to fiber optic format. A conventional digital data processor such as one used in a personal computer could serve as the central data processor 30.

Microwave transmitter/demodulator 32 includes several interconnected components that perform several functions as described below. It is a microwave energy source providing power to all of the sensing devices 14. The power signal originates in a radio frequency modulator 36, passes through a power signal channel 38, and is propagated through the wave-guide via antenna 40. Modulator 36 can be a digital radio frequency modulator. Demodulator 42 receives and demodulates signals from the sensing devices 14. The microwave transmitter/demodulator 32 communicates with the central data processor 20 via fiber optic interface 26. It employs optical to digital converter 44 to convert electrical signals into optical signals and back again when sending and receiving information to and from the central data processor 30.

Upon receiving the appropriate sensor addresses from the central data processor 30, the microwave transmitter/demodulator 32 generates both a power signal and an interrogation signal that includes the various sensor addresses. The two separate signals can be of differing frequency. The signals are propagated across the wave-guide out to the entire network of uniquely addressed sensing devices 14. The microwave transmitter/demodulator 32 employs a digital signal processor 46 with internal memory to format the interrogation data generated by the central data processor 30 before it is sent out to the sensing devices 14. The digital signal processor 46 can add overhead bits such as protocols or handshaking. The interrogation signal is modulated by the RF generator/modulator 36 and is carried through the interrogation signal channel 37 on an RF carrier that then propagates through the wave-guide via interrogation antenna 48. The digital signal processor 46 also controls the transmission duty cycle for the wireless power that is propagated through the power signal channel 38 and out to the sensing devices 14. The various microwave transmitter/demodulator components are powered by a direct current (dc) power source 50 within the underwater vehicle 10 via an electrical connection passing through a hull penetrator 52 and connecting to a power distribution circuit 74.

Figure 4:
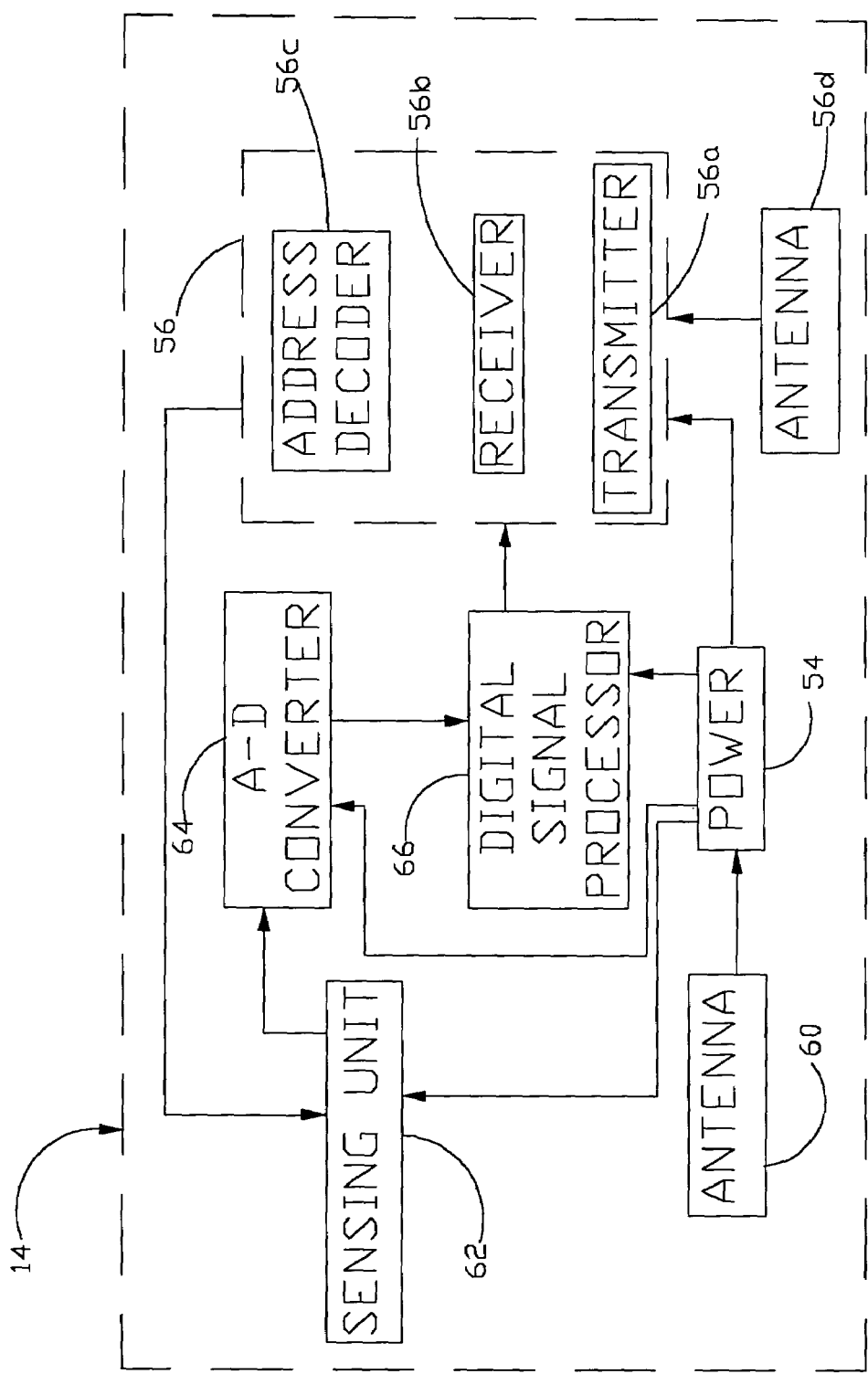
FIG. 4 shows a depiction of an individual sensing device.
Figure 5:
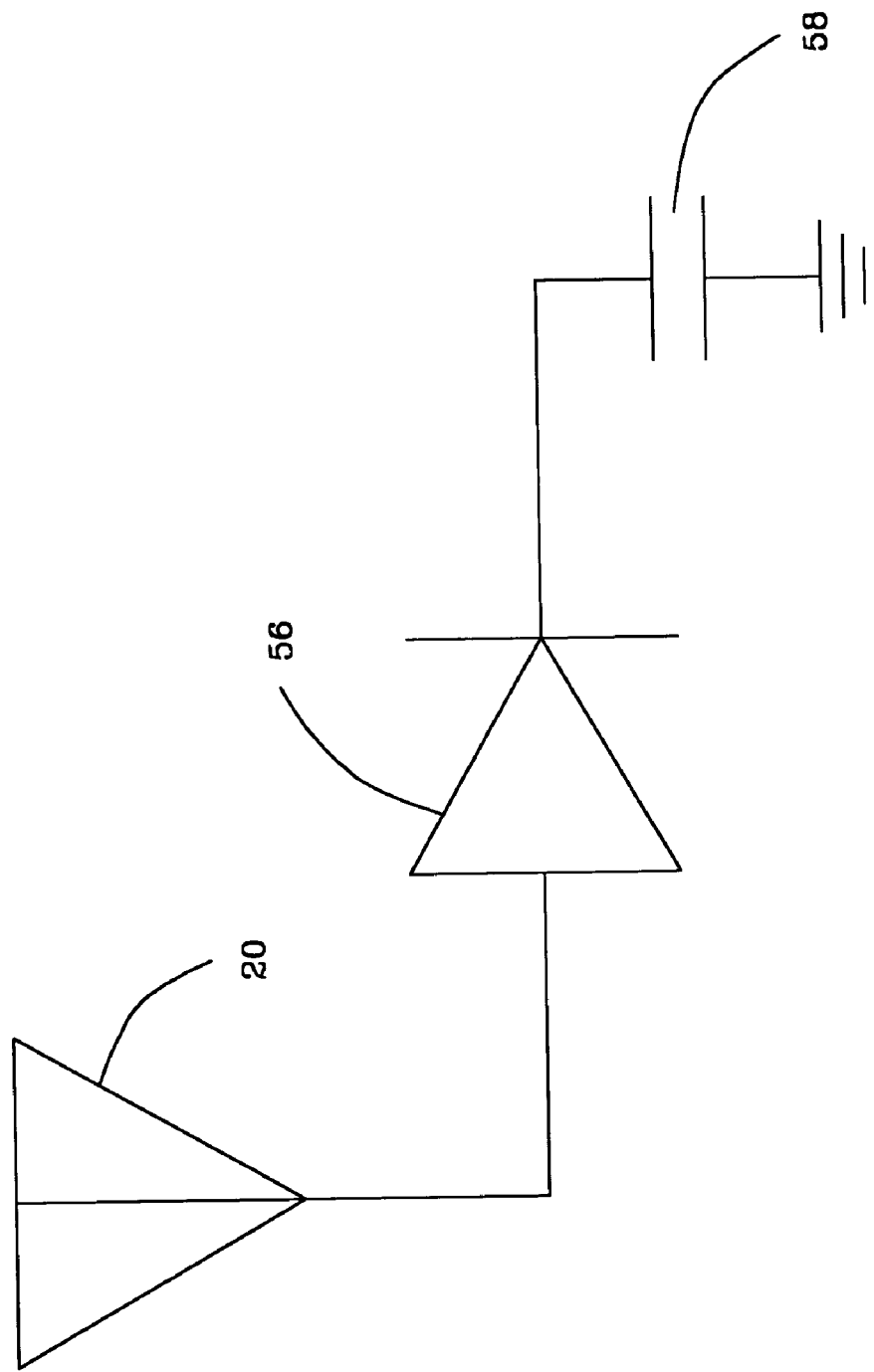
FIG. 5 shows a circuit diagram for the power detection circuit.

Referring now to FIG. 4 there is shown a block diagram of the various interconnected components of a typical sensing device 14 embedded in dielectric material 18. Many of the components of the sensing device are preferably micro-machined on a single substrate. The power detection and energy storage circuitry 54 extracts microwave energy from the wave-guide via antenna 60. The energy storage circuitry 54 illustrated in FIG. 5, may employ a very efficient low loss diode 56 and a low leakage charge capacitor 58, connected to antenna 60.

In order to conserve energy until sensor data is needed, all of the sensing devices 14 are kept in a "sleep mode." When they need to be activated microwave energy is transmitted to the sensing devices 14. The power and energy storage circuitry 54 on each sensing device 14 detects and rectifies the energy thereby powering the device.

The wireless transceiver component 56 has a transmitter 56a, a receiver 56b, an address decoder 56c and an antenna 56d. Once powered, the transceiver 56 receives the interrogation signal as it propagates through the wave-guide and decodes the address to see if the interrogation command is directed to the transceiver's associated sensor. The sensor transceiver 56 receives the interrogation signal and also transmits the measurement data. It employs well known RF decoding and detection integrated circuits used in digital cellular phones such as those manufactured by Philips, Motorola and Nokia. The advantage of using cell phone integrated circuits is that they function at very low power levels, generally in the order of 0.6 watts to 3 watts. Low power consumption is a vital asset in a limited resource environment such as an underwater vehicle.

When an interrogation signal is addressed to a particular sensing device 14, the sensing unit 62 is directed to take the actual measurement of the environmental phenomenon that requires quantifying—for example: a hydrophone to measure sound in the water, a thermometer to measure temperature, or a photocell to measure radiant energy. The sensing unit 62 is the only part of the sensing device 14 that is directly exposed to the surrounding environment (assumed to be water). The measurement data produced by the sensing unit 62 can be in analog format. Analog format data can be converted to a digital electronic signal by a surface-mounted analog to digital converter 64 such as those produced by Texas Instruments, Analog Devices or the like. The digital signal is then processed by a low-power surface-mount digital signal processing microprocessor 66 that converts, addresses and formats the measurement data. Both the analog to digital converter 64 and the digital signal processor 66 have internal memory buffers. The measurement data is then transmitted back to the microwave transmitter/demodulator 32 by the wireless RF transceiver 56 as an electromagnetic signal propagating through the wave-guide.

The RF transceiver 56 modulates the carrier with the data using any one of several types of modulation, such as spread spectrum, quadratenery phase shift keying or frequency hopping depending upon the dielectric material being used and the communication channel characteristics. When the microwave transmitter/demodulator 32 receives the sensor data via antenna 48, the RF demodulator 42 removes the RF signal coming back from the sensor transceivers 56, producing digital information which is converted from an electrical signal to an optical signal by converter 44 and routed along the fiber optic cable 26 to converter 34 where it is converted back to a digital electrical signal, analyzed in real time, and stored by the central data processor 30.

The advantages of the present invention over the prior art are that: The power transmission and data communication apparatus provide a novel approach for implementing a very large-scale sensor network for use on an undersea vehicle within the constraints of the undersea environment; Wireless transmission avoids the cost, complexity and maintenance problems of using wire bundles, batteries or fuel cell materials; Digital cell phone integrated circuit chip sets are well characterized, multiple sourced, affordable, reliable and allow for a low power and efficient data communication system; and By embedding sensing devices, transceivers, and metal tape into a dielectric material that comprises the outer covering of a underwater vehicle there is no significant impact in weight and shape of the underwater vehicle's hull.

What has thus been described is a wireless power transmission and data communication network that provides efficient interrogation and powering of sensors for use on underwater vehicles. Specifically, the exterior of an underwater vehicle's hull is covered with an elastomeric dielectric material. Embedded within the dielectric outer covering is an N dimensional array of sensing devices and strips of conductive metal tape. The combination of metal tape within the dielectric material serves as a wave-guide that allows the propagation of electromagnetic waves such as microwaves through the dielectric outer covering of the underwater vehicle's hull surface. Microwave energy generated by a microwave transceiver serves to both power the sensor network and address and interrogate the sensing devices. The sensing devices, which are uniquely addressable, detect and rectify the microwave energy for power. The sensing devices also detect the address and interrogation signal generated by the microwave transmitter. The sensing devices take readings and transmit the data results along the wave-guide by employing radio frequency (RF) decoding and detection devices similar to those used in cellular telephones. The sensor data is converted to a fiber optic format and transmitted to and processed by a digital processor within the hull of the underwater vehicle.

Obviously many modifications and variations of the present invention may become apparent in light of the above teachings. For example: Different dielectric materials may be used depending upon their insulating properties. Electromagnetic waves of frequencies either lower or higher than microwaves could be used. Macro-scale, nano-scale or MEMS sensors could be used. An electrical interface could be used rather than a fiber optic interface. Inductive power detection circuits could be used rather than capacitors. Local mechanical or chemical energy harvesting may be used rather than an electromagnetic wave source. Animal neural-tissue or hybrid computers may be used instead of conventional solid-state man made computers. A three dimensional communication network, rather than a conventional one dimensional network may be used.

In light of the above, it is therefore understood that within the scope of the appended claims, the invention may be practiced otherwise than as specifically described.

What is claimed is:

1. A sensor apparatus for disposition on the exterior surface of a vehicle, comprising:
    a transmission medium comprising a dielectric material having a plurality of parallel strips of electrically conductive metal tape embedded there within, disposable over the exterior surface of the vehicle;
    an electromagnetic energy source affixed to said transmission medium, for transmitting and receiving electromagnetic waves across said transmission medium;
    a plurality of sensing devices disposed in communication with said transmission medium and over a pre-selected area of the exterior surface, said sensing devices capable of receiving electromagnetic waves generated by said electromagnetic energy source and extracting power and digital signals from said electromagnetic waves, said sensing devices further transmitting digital signals corresponding to sensed data to said electromagnetic energy source; and
    a data processor connected to said electromagnetic energy source, said data processor controlling the operation of the electromagnetic energy source and processing transmitted digital signals received at the electromagnetic energy source.

2. An apparatus according to claim 1 wherein said electromagnetic energy source is a microwave transceiver.

3. An apparatus according to claim 2 wherein said sensing devices employ sensing device transceivers in electrical signal communication with said transmission medium for transmitting and receiving electromagnetic waves.

4. An apparatus according to claim 2 wherein said sensing devices employ a decoding device capable of decoding digital signals received from electromagnetic waves generated by said electromagnetic energy source.

5. An apparatus according to claim 4 wherein said decoding device is a digital cellular telephone integrated circuit.

6. A sensor apparatus for disposition on the exterior surface of a vehicle, comprising:
    a transmission medium disposable over the exterior surface of the vehicle;
    an electromagnetic energy source affixed to said transmission medium, for transmitting and receiving electromagnetic waves across said transmission medium;
    a plurality of sensing devices disposed in communication with said transmission medium and over a pre-selected area of the exterior surface, said sensing devices capable of receiving electromagnetic waves generated by said electromagnetic energy source and extracting power and digital signals from said electromagnetic waves, said sensing devices further transmitting digital signals corresponding to sensed data to said electromagnetic energy source, said sensing devices employing a decoding device capable of decoding digital signals received from electromagnetic waves generated by said electromagnetic energy source; and
    a data processor connected to said electromagnetic energy source, said data processor controlling the operation of the electromagnetic energy source and processing transmitted digital signals received at the electromagnetic energy source.

7. An apparatus according to claim 6 wherein said transmission medium comprises a dielectric material having a plurality of parallel strips of electrically conductive metal tape embedded there within.

8. An apparatus according to claim 7 wherein said electromagnetic energy source is a microwave transceiver.

9. An apparatus according to claim 8 wherein said sensing devices employ sensing device transceivers in electrical signal communication with said transmission medium for transmitting and receiving electromagnetic waves.

10. An apparatus according to claim 6 wherein said decoding device is a digital cellular telephone integrated circuit.

11. An apparatus according to claim 6 wherein said vehicle is a submerged underwater vehicle having a metal hull.

12. A sensor apparatus for disposition on the exterior surface of a vehicle, comprising:
    a transmission medium disposable over the exterior surface of the vehicle said transmission medium comprising a dielectric material having a plurality of parallel strips of electrically conductive metal tape embedded there within;
    an electromagnetic energy source affixed to said transmission medium, for transmitting and receiving electromagnetic waves across said transmission medium, said electromagnetic energy source comprising a microwave transceiver;
    a plurality of sensing devices disposed in communication with said transmission medium and over a pre-selected area of the exterior surface, said sensing devices capable of receiving electromagnetic waves generated by said electromagnetic energy source and extracting power and digital signals from said electromagnetic waves, said sensing devices further transmitting digital signals corresponding to sensed data to said electromagnetic energy source, said sensing devices employing sensing device transceivers in electrical signal communication with said transmission medium for transmitting and receiving electromagnetic waves, said sensing devices employing a decoding device capable of decoding digital signals received from electromagnetic waves generated by said electromagnetic energy source; and
    a data processor connected to said electromagnetic energy source, said data processor controlling the operation of the electromagnetic energy source and processing transmitted digital signals received at the electromagnetic energy source.

13. An apparatus according to claim 12 wherein said decoding device is a digital cellular telephone integrated circuit.

14. An apparatus according to claim 12 wherein said plurality of sensing devices are MEMS sensing devices.

15. An apparatus according to claim 12 wherein said microwave transceiver broadcasts a power signal at a first frequency and a data signal at a second frequency.

16. An apparatus according to claim 15 wherein said plurality of sensing devices have a first antenna for receiving said power signal and a second antenna for receiving said data signal.

* * * * *